(12) United States Patent
Wang et al.

(10) Patent No.: US 10,699,534 B2
(45) Date of Patent: Jun. 30, 2020

(54) REAL-TIME STREAMING SYSTEM FOR MACHINE

(71) Applicants: Jian-Hong Wang, Taichung (TW); Hsing-Wen Wang, Taichung (TW)

(72) Inventors: Jian-Hong Wang, Taichung (TW); Hsing-Wen Wang, Taichung (TW)

(73) Assignee: Jian-Hong Wang, Taichung (TW)

( * ) Notice: Subject to any disclaimer, the term of this patent is extended or adjusted under 35 U.S.C. 154(b) by 124 days.

(21) Appl. No.: 15/867,579

(22) Filed: Jan. 10, 2018

(65) Prior Publication Data

US 2019/0213843 A1    Jul. 11, 2019

(51) Int. Cl.
| | | |
|---|---|---|
| *G07F 17/32* | (2006.01) | |
| *H04N 21/478* | (2011.01) | |
| *H04N 21/414* | (2011.01) | |
| *H04N 21/4223* | (2011.01) | |
| *H04N 21/2187* | (2011.01) | |
| *H04N 21/63* | (2011.01) | |
| *H04M 1/725* | (2006.01) | |
| *H04L 29/08* | (2006.01) | |
| *H04L 29/06* | (2006.01) | |

(52) U.S. Cl.
CPC ........ *G07F 17/3297* (2013.01); *G07F 17/323* (2013.01); *G07F 17/3211* (2013.01); *G07F 17/3218* (2013.01); *G07F 17/3244* (2013.01); *G07F 17/3253* (2013.01); *G07F 17/3272* (2013.01); *H04N 21/2187* (2013.01); *H04N 21/41407* (2013.01); *H04N 21/4223* (2013.01); *H04N 21/4781* (2013.01); *H04N 21/632* (2013.01); *H04L 67/104* (2013.01); *H04L 67/38* (2013.01); *H04M 1/72544* (2013.01)

(58) Field of Classification Search
CPC .......... G07F 17/3297; A63F 9/24; A63F 9/30; A63F 9/016
See application file for complete search history.

(56) References Cited

U.S. PATENT DOCUMENTS

| | | | |
|---|---|---|---|
| 9,818,265 B1* | 11/2017 | Shoemaker, Jr. | ... G07F 17/3297 |
| 10,252,149 B2* | 4/2019 | Huang | ....... A63F 9/24 |
| 2002/0193159 A1* | 12/2002 | Maejima | ................. G07F 17/32 463/20 |
| 2008/0108434 A1* | 5/2008 | Mann | ....................... G07F 17/32 463/42 |
| 2011/0078030 A1* | 3/2011 | Borst | ..................... G06Q 30/02 705/14.73 |

(Continued)

*Primary Examiner* — James S. McClellan
*Assistant Examiner* — Kevin M Carter
(74) *Attorney, Agent, or Firm* — Muncy, Geissler, Olds & Lowe, P.C.

(57) ABSTRACT

A real-time streaming system for a machine is provided, including at least one camera, being adapted for shooting a real-time image of the machine, the machine being adapted for being remote controlled by an player; a cloud processing unit, being communicated with the at least one camera and adapted for communicable with the machine through an internet, the cloud processing unit including an image server, the image server being adapted for being communicable with a plurality of viewer ends through the internet so that the plurality of viewer ends receive the real-time image; wherein the machine provides a peer-to-peer network (P2P) connection, the player receives the real-time image from the at least one camera in the peer-to-peer network (P2P) connection.

7 Claims, 7 Drawing Sheets

(56) References Cited

U.S. PATENT DOCUMENTS

2016/0055712 A1* 2/2016 Arnone .................. G07F 17/32
463/10
2016/0078716 A1* 3/2016 Goldman ............ G07F 17/3223
463/5
2018/0096565 A1* 4/2018 Shoemaker, Jr. ... G07F 17/3297

* cited by examiner

REAL-TIME STREAMING SYSTEM FOR MACHINE

BACKGROUND OF THE INVENTION

Field of the Invention

The present invention relates to a real-time streaming system for a machine.

Description of the Prior Art

A game machine such as a crane machine on the market is controlled by a consumer which put a required number of coins into a slot of the game machine and the consumer also can get a merchandise of the game machine which is sold. After the game is over or shipping the merchandise, the consumer cannot control the game machine. Thus, the game machine is considered as completing a transaction. Because of the traditional game machines need to be operated and consumed by the consumers to go the place where the game machines are placed to achieve the purpose of sales, sales channels of the merchandises are limited, so as to limit the growth of the sales performance. Therefore, in recent years, with the development of internet technology, there is an online game machine that can be operated by an operator through an online operation to obtain the right to sell the merchandises or control the online game machine.

However, the traditional online game machine have some defects are shown below: when the operator operates the game machine, the screen often delays so as to decrease the accuracy of operation; besides, when there are too many people on line to watch the operation of the game machine by the operator, the screen is easily unstable due to poor signal; moreover, the traditional online game machine is lack of interactive features; viewer ends can only view the game machine; and it is unable to improve the number of viewers and create discussion topics to attract more consumers.

The present invention is, therefore, arisen to obviate or at least mitigate the above mentioned disadvantages.

SUMMARY OF THE INVENTION

An object of the present invention is to provide a real-time streaming system for a machine, in which the real-time streaming system for the machine ensures the player can operate the control device without delay and view a real-time image in real-time, so as to avoid the delay of the real-time image, and can allow the large number of viewer ends that don't need to control the online game machine to view the real-time image smoothly to improve the number of the viewer ends create discussion topics, to attract more consumers.

To achieve the above and other objects, a real-time streaming system for a machine is provided, including at least one camera, being adapted for shooting a real-time image of the machine, the machine being adapted for being remote controlled by an player; a cloud processing unit, being communicable with the at least one camera and adapted for being communicable with the machine through an internet, the cloud processing unit including an image server, the image server being adapted for being communicable with a plurality of viewer ends through the internet so that the plurality of viewer ends receive the real-time image; and wherein the machine provides a peer-to-peer network (P2P) connection, and the player receives the real-time image from the at least one camera in the peer-to-peer network (P2P) connection.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
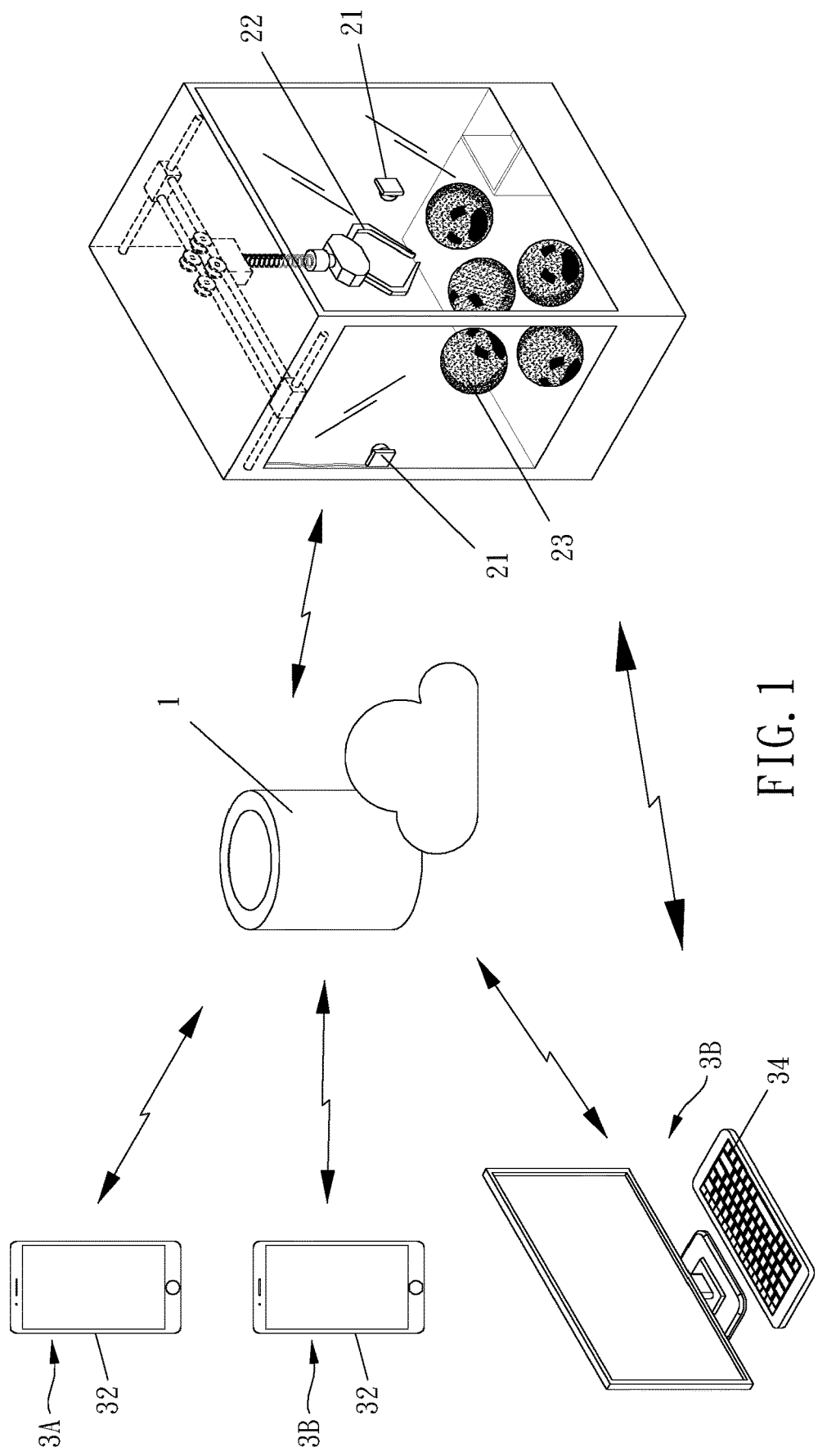
FIG. 1 is a drawing showing the structure of a real-time streaming system for machine according to a preferred embodiment of the present invention.
Figure 2:
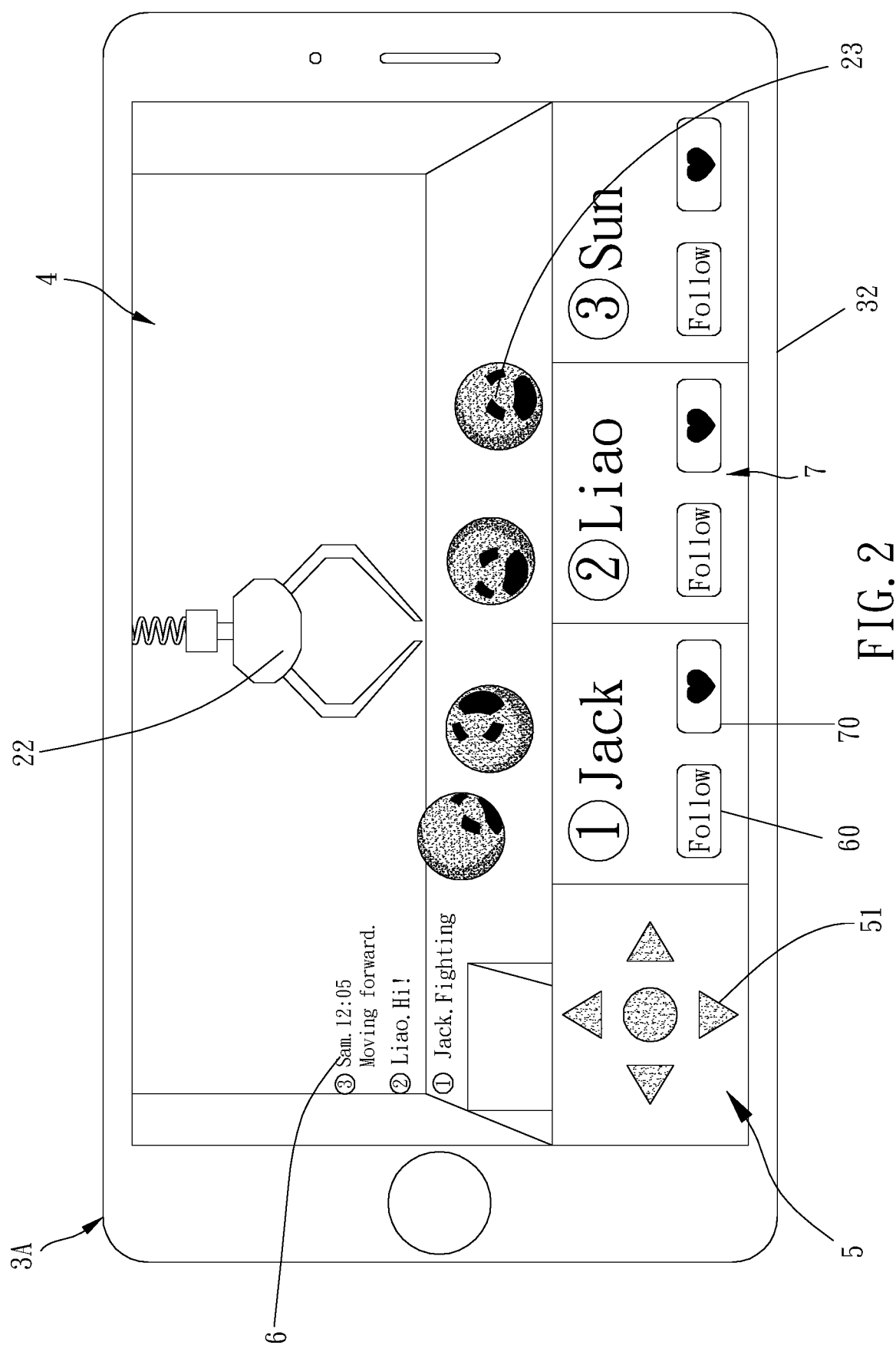
FIG. 2 is a drawing showing the operation of a preferable embodiment of the present invention.
Figure 3:
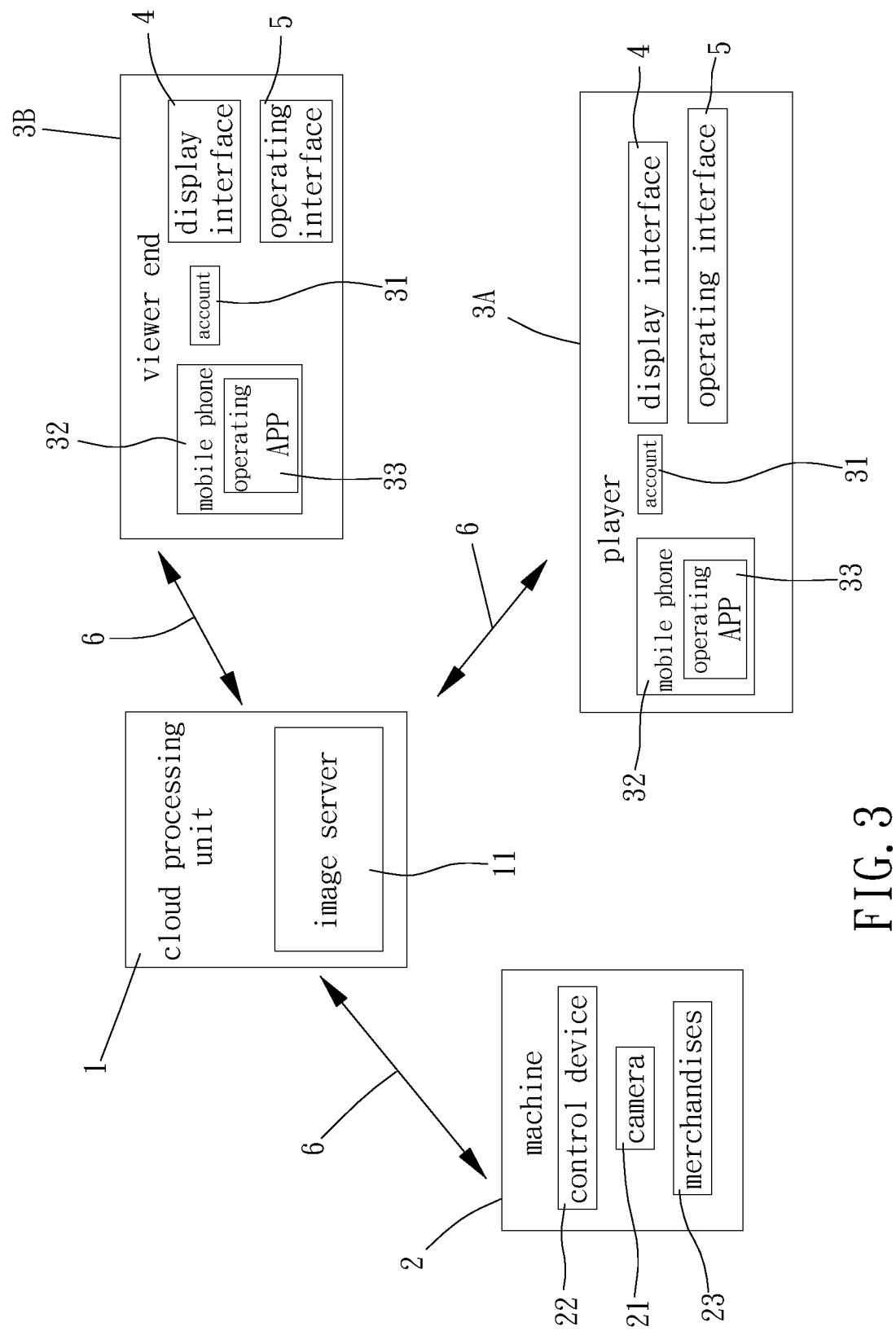
FIG. 3 is a block diagram of the structure of a real-time streaming system for machine according to a preferred embodiment of the present invention.
Figure 4:
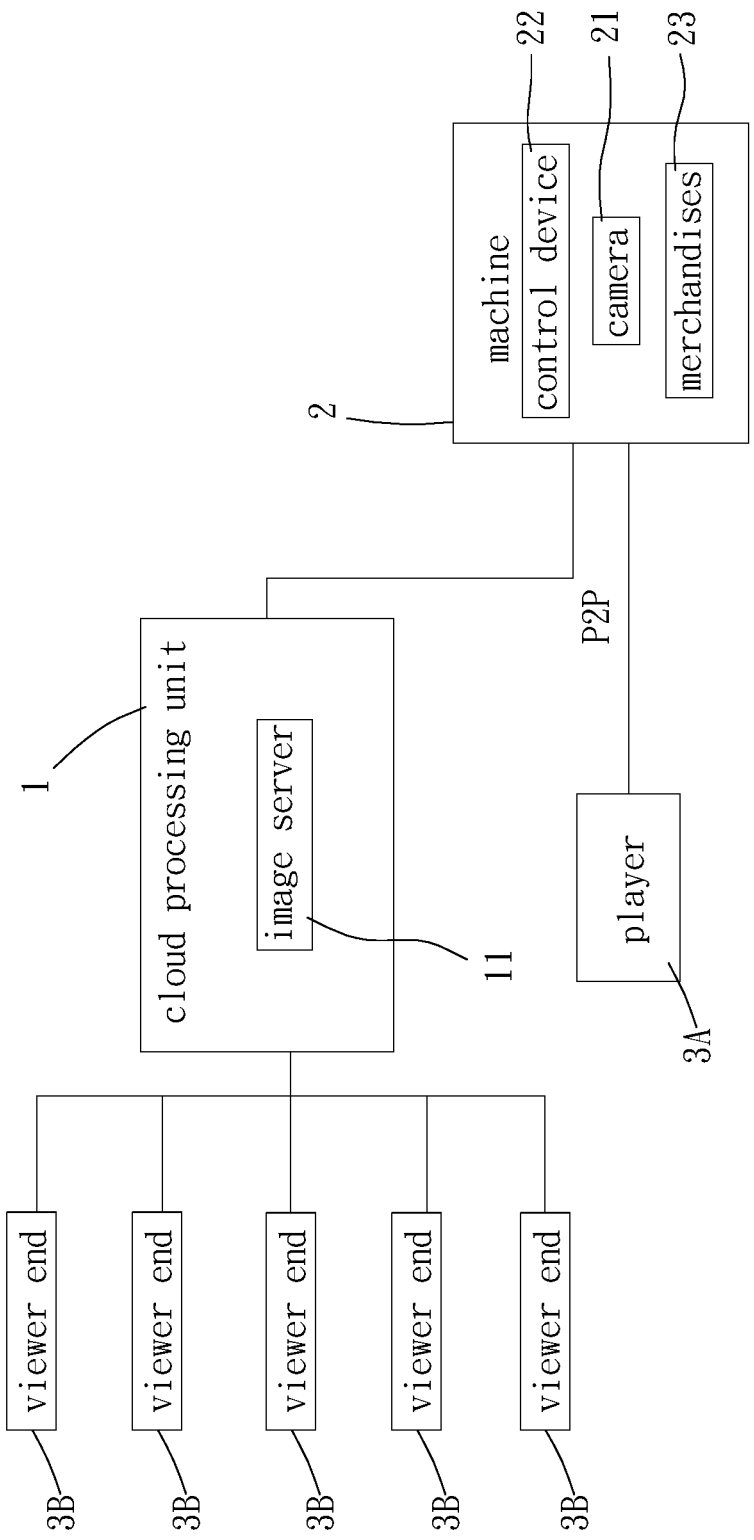
FIG. 4 is another block diagram of the structure of a real-time streaming system for machine according to a preferred embodiment of the present invention.
Figure 5:
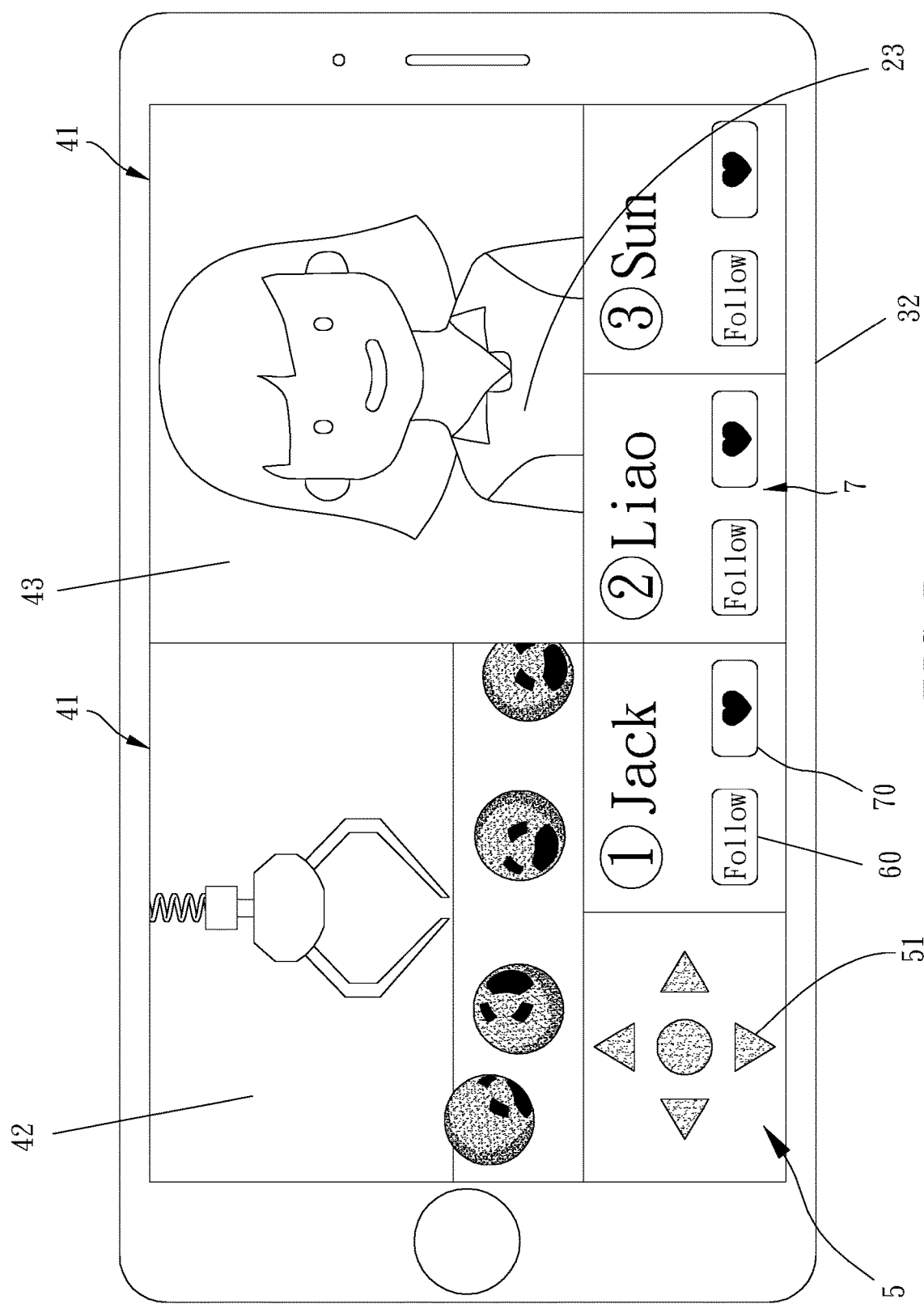
FIG. 5 is a drawing showing a display interface of a preferable embodiment of the present invention.
Figure 6:
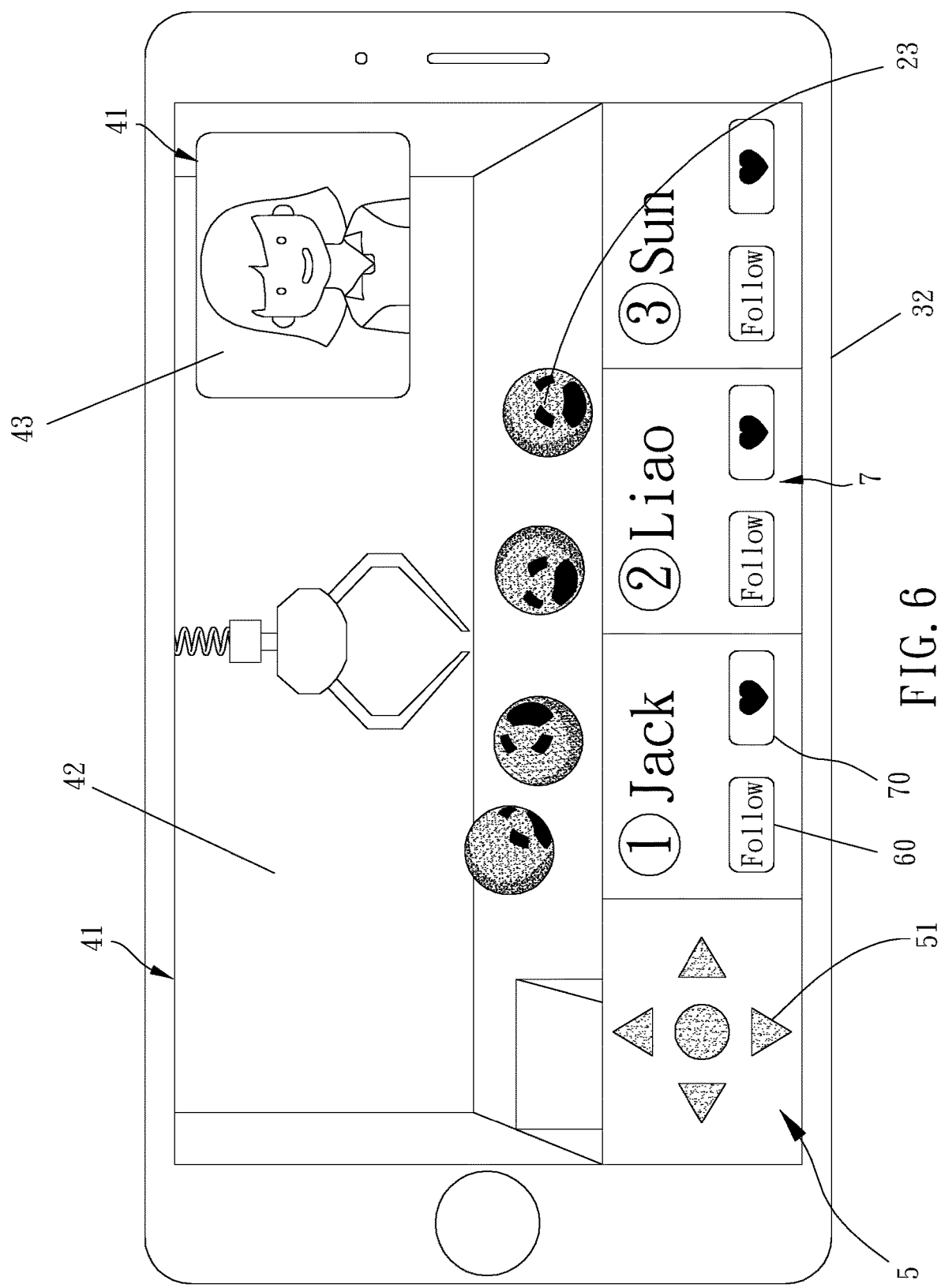
FIG. 6 is a drawing showing another display interface of a preferable embodiment of the present invention.

FIGS. 1-6 show a real-time streaming system for a machine according to a preferred embodiment of the present invention. The real-time streaming system for a machine includes at least one camera 21 and a cloud processing unit 1.

The at least one camera 21 is adapted for shooting a real-time image 42 of the machine 2, and the machine 2 is adapted for being remote controlled by player 3A. In this embodiment, a number of the at least one camera 21 is two, so as to take motion images from the different directions.

The cloud processing unit 1 is communicable with the at least one camera 21 and adapted for being communicable with the machine 2 through an internet. The cloud processing unit 1 includes an image server 11, and the image server 11 is adapted for being communicable with a plurality of viewer ends 3B through the internet so that the plurality of viewer ends 3B receive the real-time image 42.

Wherein the machine 2 provides a peer-to-peer network (P2P) connection, the player 3A receives the real-time image 42 from the at least one camera 21 in the peer-to-peer network (P2P) connection. In other embodiment, the player 3A can control the machine 2 in a Bluetooth connection or a RF connection.

It is to be noted that the player 3A who is controlling the control device 22 can control the control device 22 and view the real-time image 42 from the at least one camera 21 without delaying in the peer-to-peer network (P2P) connection to avoid a low quality of games.

Furthermore, the machine 2 includes a control device 22, each of the plurality viewer ends 3B and the player 3A respectively include a display interface 4 and an operating interface 5, the display interface 4 displays the real-time image 42 and at least one message information 6, the player 3A is controllable the control device 22 by the operating interface 5, at least one of the plurality of viewer ends 3B and the player 3A is sendable the at least one message information 6 through the cloud processing unit 1 to at least one of the viewer ends 3B and the player 3A, and the at least one message information 6 displays on the display interface 4 of at least one of the plurality of viewer ends 3B and the player 3A.

Moreover, each of the at least one message information 6 includes at least one of words, emojis and sounds. In this embodiment, each of the message information 6 is the words for chatting. Thus, the viewer ends 3B which uncontrols the control device 22 can provide advice to the player 3A who is operating the control device 22. Besides, the plurality of viewer ends 3B can discuss a skill of controlling the control device 22 to each other. Thereby, the real-time streaming system for machine can improve the popularity of viewer ends 3B by providing a viewer ends 3B interacting function.

Preferably, in order to provide amount of the viewer ends 3B to watch the real-time image 42 smoothly, the image server 11 is adapted for being communicated with the plurality of viewer ends 3B through the internet to get the real-time image 42. In this embodiment, the image server 11 is a real time non-volatile residue (NVR) to provide a sufficient internet bandwidth to transmit the real-time image 42 to the plurality of viewer ends 3B smoothly, and to avoid declining the popularity of viewer ends 3B because of transmission delay of the real-time image 42.

Each of the plurality of viewer ends 3B further includes an account 31, and an amount of money of the account 31 is adapted for paying for the machine 2 to become the player 3A to control the control device 22 of the machine 2, each of the viewer ends 3B save the amount of money to account 31 in advance to pay the money to the machine 2 more easily, and improve the convenience of payment.

One of the plurality of viewer ends 3B is transferable the amount of money from the account 31 to another account 31 of one of the plurality viewer ends 3B through the cloud processing unit 1, so as to improve the interaction between the plurality viewer ends 3B to increase the popularity of viewer ends 3B and a purchase intention.

The machine 2 includes a plurality of merchandises 23, the control device 22 is adapted for getting the plurality of merchandises 23, when the player 3A controls the control device 22 to get one of the plurality merchandises 23, the player 3A is givable one of the plurality viewer ends 3B the merchandise 23, similarly to improve the interaction between the plurality viewer ends 3B to increase the popularity of viewer ends 3B and a purchase intention.

In this embodiment, the machine 2 is a crane machine, and the control device 22 is a claw for gripping the plurality of the merchandises 23. In other embodiment, the machine can be a shooting machine, a scissor cutting toy machine, or other toy machine with different structures.

At least one of the viewers end 3B and the player 3A respectively further includes a mobile phone 32, the mobile phone 32 is installed an operating APP 33, the mobile phone 32 is communicated with the cloud processing unit 1 through the internet, and the mobile 32 of player 3A runs the operating APP 33 to control the control device 22. The operating interface 5 includes a plurality of buttons 51, the plurality of buttons 51 are adapted for controlling a movement of control device 22. The player 3A can touch the screen of the mobile phone 32 to control the plurality of buttons 51 to control the control device 22. Specifically, the viewer ends 3B can be a computer 34 or a tablet computer, the operating interface 5 is a keyboard of the computer 34.

After the computer 34 connects to the cloud processing unit 1, the player 3A can also choose to control the control device 22.

The display interface 4 further includes an online list 7, the online list 7 is adapted for showing id names of the plurality of viewer ends 3B which are communicated with the image server 11 so that the plurality of the viewer ends 3B can interact with one another easily to improve the willingness of sending messages, so as to increase the popularity of viewer ends 3B and a purchase intention. Besides, the cloud processing unit 1 stores the id names and the real-time image 42 so that the plurality of viewer ends 3B and the player 3A can read the real-time image 42 which is recorded before.

Figure 7:
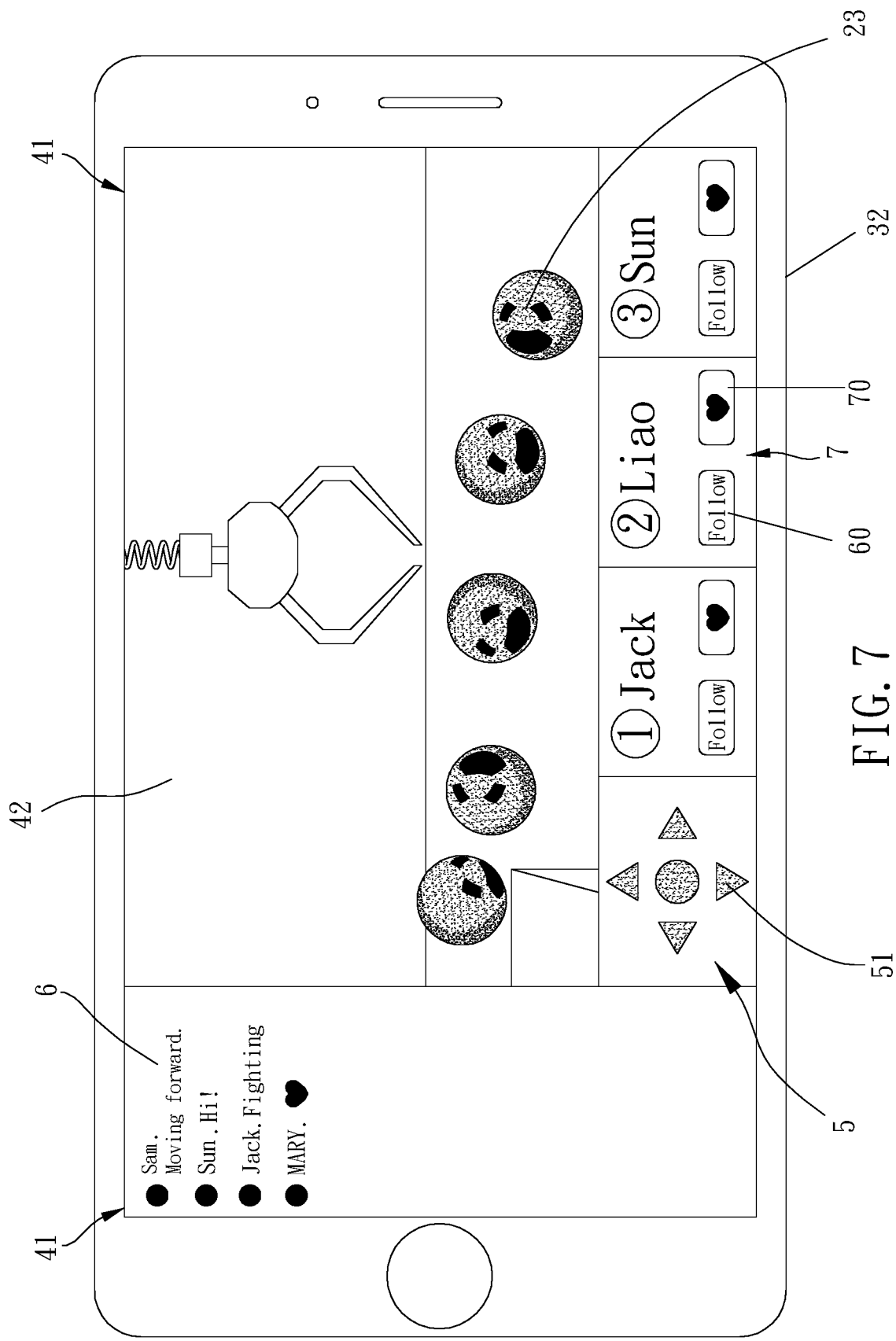
FIG. 7 is a drawing showing the other display interface of a preferable embodiment of the present invention.

Moreover, the display interface 4 further includes a plurality of display zones 41, one of the plurality of display zones 41 displays the real-time image 42, another of the plurality of display zones displays a video 43 which is transmitted from one of the plurality viewer ends 3B and the player 3A. Moreover, the other of the plurality of display zones 41 displays the at least one message information 6 such as the words, shown in FIG. 7. Specifically, the plurality of display zones 41 can be arranged side-by-side or overlapped. Thus, the plurality of viewer ends 3B and the player 3A can be communicated with each other more directly and speedily, and also can improve the interaction between the plurality of viewer ends 3B and the player 3A. Thus, the plurality of the viewer ends 3B and player 3A can be communicated with each other through the words, the sounds, the emojis, and the others of message information in real-time.

Furthermore, the display interface 4 further includes at least one following button 60 and at least one like button 70 which are respectively corresponding to one of the viewer ends 3B and the player 3A. Thus, each viewer ends 3B and the player 3A can active the at least one following button 60 to follow the at least one viewer ends 3B and the player 3A. Besides, each viewer ends 3B and the player 3A can active the at least one like button 70 to encourage one of the viewer ends 3B and the player 3A.

Above mentioned, the real-time streaming system for the machine of the present invention, ensures the player can operate the control device without delay and view the real-time image, so as to avoid the delay of the real-time image. And the player can control the control device and view the real-time image from the at least one camera without delaying in the peer-to-peer network (P2P) connection to avoid a low quality of games. Moreover, in order to provide amount of the viewer ends to watch the real-time image smoothly, the image server is adapted for being communicated with the plurality of viewer ends through the internet to get the real-time image.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A real-time streaming system for a machine, including: at least one camera, being adapted for shooting a real-time image of the machine, the machine being adapted for being remote controlled by a player; a cloud processing unit, being communicable with the at least one camera and adapted for being communicable with the machine through an internet, the cloud processing unit including an image server, the image server being adapted for being communicable with a plurality of viewer ends through the internet so that the plurality of viewer ends receive the real-time image; wherein the machine provides a peer-to-peer network (P2P) connection, and a player device receives the real-time image from the at least one camera in the peer-to-peer network (P2P) connection; wherein the machine includes a control device, each of the plurality of viewer ends and the player device respectively include a display interface and an operating interface, the display interface displays the real-time image and at least one message information, the player device is controllable the control device by the operating interface, at least one of the plurality of viewer ends and the player device is sendable the at least one message information through the cloud processing unit to at least one of the viewer ends and the player device, and the at least one message information displays on the display interface of at least one of the plurality of viewer ends and the player device; wherein each of the plurality of viewer ends further includes an account, and an amount of money of the account is adapted for paying for the machine to become the player device to control the control device of the machine; wherein one of the plurality of viewer ends is transferable the amount of money from the account to another account of one of the plurality of viewer ends through the cloud processing unit.

2. The real-time streaming system for the machine of claim 1, wherein the machine includes a plurality of merchandises, the control device is adapted for getting the plurality of merchandises, when the player controls the control device to get one of the plurality merchandises, the player is givable one of the plurality of viewer ends the merchandise.

3. The real-time streaming system for the machine of claim 2, wherein the machine is a crane machine, and the control device is a claw for gripping the plurality of merchandises.

4. The real-time streaming system for the machine of claim 1 wherein at least one of the plurality of viewer ends and the player device respectively further includes a mobile phone, the mobile phone is installed an operating APP, the mobile phone is communicated with the cloud processing unit through the internet, and the mobile phone of the player device runs the operating APP to control the control device.

5. A real-time streaming system for the machine, including: at least one camera, being adapted for shooting a real-time image of the machine, the machine being adapted for being remote controlled by a player; a cloud processing unit, being communicable with the at least one camera and adapted for being communicable with the machine through an internet, the cloud processing unit including an image server, the image server being adapted for being communicable with a plurality of viewer ends through the internet so that the plurality of viewer ends receive the real-time image; wherein the machine provides a peer-to-peer network (P2P) connection, and the player device receives the real-time image from the at least one camera in the peer-to-peer network (P2P) connection; wherein the machine includes a control device, each of the plurality of viewer ends and the player device respectively include a display interface and an operating interface, the display interface displays the real-time image and at least one message information, the player is controllable the control device by the operating interface, at least one of the plurality of viewer ends and the player device is sendable the at least one message information through the cloud processing unit to at least one of the viewer ends and the player device, and the at least one message information displays on the display interface of at least one of the plurality of viewer ends and the player device; wherein the display interface further includes a plurality of display zones, one of the plurality of display zones displays the real-time image, another of the plurality of display zones displays a video which is transmitted from one of the plurality of viewer ends and the player device.

6. The real-time streaming system for the machine of claim 1, wherein the display interface further includes an online list, the online list is adapted for showing id names of the plurality of viewer ends which are communicated with the image server; and the operating interface includes a plurality of buttons, the plurality of buttons are adapted for controlling a movement of control device.

7. The real-time streaming system for the machine of claim 1, wherein each of the at least one message information includes at least one of words, emojis and sounds; the image server is a real time non-volatile residue (NVR); the machine includes a plurality of merchandises, the control device is adapted for getting the plurality of merchandises, when the player is controllable the control device to get one of the plurality merchandises, the player is givable one of the plurality of viewer ends the merchandise; the machine is a crane machine, and the control device is a claw for gripping the plurality of the merchandises; at least one of the plurality of viewer ends and the player device respectively further includes a mobile phone, the mobile phone is installed an operating APP, the mobile phone is communicated with the cloud processing unit through the internet, and the mobile phone of the player device runs the operating APP to control the control device; the display interface further includes a plurality of display zones, one of the plurality of display zones displays the real-time image, another of the plurality of display zones displays a video which is transmitted from one of the plurality of viewer ends and the player device and the other of the plurality of display zones displays the at least one message information; the display interface further includes an online list, the online-list is adapted for showing id names of the plurality of viewer ends which are communicated with the image server; the operating interface includes a plurality of buttons, the plurality of buttons are adapted for controlling a movement of control device; the cloud processing unit stores the id names and the real-time image; the display interface further includes at least one following button and at least one like button which are respectively corresponding to one of the viewer ends and the player device.

* * * * *